(12) United States Patent
Nishioka

(10) Patent No.: US 9,618,036 B2
(45) Date of Patent: Apr. 11, 2017

(54) TILTING-PAD BEARING

(71) Applicant: MITSUBISHI HEAVY INDUSTRIES, LTD., Tokyo (JP)

(72) Inventor: Tadasuke Nishioka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/911,060

(22) PCT Filed: Jan. 27, 2015

(86) PCT No.: PCT/JP2015/052107
§ 371 (c)(1),
(2) Date: Feb. 9, 2016

(87) PCT Pub. No.: WO2016/080000
PCT Pub. Date: May 26, 2016

(65) Prior Publication Data
US 2016/0169276 A1    Jun. 16, 2016

(30) Foreign Application Priority Data

Nov. 20, 2014  (JP) ................................ 2014-235423

(51) Int. Cl.
F16C 17/03    (2006.01)
F16C 32/06    (2006.01)
(Continued)

(52) U.S. Cl.
CPC .............. *F16C 17/22* (2013.01); *F16C 17/03* (2013.01); *F16C 33/108* (2013.01); *F16C 33/1075* (2013.01); *F16C 2240/70* (2013.01)

(58) Field of Classification Search
CPC ........ F16C 17/03; F16C 17/035; F16C 17/22; F16C 33/1075; F16C 33/108
See application file for complete search history.

(56) References Cited

U.S. PATENT DOCUMENTS 3,205,028 A * 9/1965 Mech ..................... F16C 17/03
                                                                  384/117
4,602,873 A    7/1986 Izumi et al.
(Continued)

FOREIGN PATENT DOCUMENTS

DE    28 02 076 A1    7/1979
DE    28 02 098 A1    7/1979
(Continued)

OTHER PUBLICATIONS

International Search Report and Written Opinion of the International Searching Authority (Forms PCT/ISA/210, PCT/ISA/220 and PCT/ISA/237), dated May 12, 2015, for International Application No. PCT/JP2015/052107.
(Continued)

*Primary Examiner* — Phillip A Johnson
(74) *Attorney, Agent, or Firm* — Birch, Stewart, Kolasch & Birch, LLP

(57) ABSTRACT

A tilting-pad bearing for rotatably supporting a rotor includes: a casing; and a plurality of bearing pads each mounted to the casing pivotably about a pivot. Each of the plurality of bearing pads has a bearing pad surface facing the rotor, the bearing pad surface including a first region disposed on an upstream side in a rotational direction of the rotor and having a first curvature radius, and a second region disposed on a downstream side of the first region in the rotational direction and having a second curvature radius smaller than the first curvature radius.

11 Claims, 8 Drawing Sheets

(51) Int. Cl.
 F16C 17/22 (2006.01)
 F16C 33/10 (2006.01)

(56) References Cited

U.S. PATENT DOCUMENTS

| | | | | |
|---|---|---|---|---|
| 4,624,584 | A * | 11/1986 | Odermatt | F16C 33/1075 384/100 |
| 5,030,015 | A | 7/1991 | Baker et al. | |
| 5,772,335 | A | 6/1998 | Miller et al. | |
| 2002/0061146 | A1 * | 5/2002 | Ono | F16C 33/1065 384/291 |
| 2013/0028731 | A1 * | 1/2013 | Mimura | F16C 17/03 415/229 |

FOREIGN PATENT DOCUMENTS

| | | |
|---|---|---|
| EP | 1 369 605 A2 | 12/2003 |
| JP | 58-102819 A | 6/1983 |
| JP | 58-149415 A | 9/1983 |
| JP | 58-180816 A | 10/1983 |
| JP | 63-53915 U | 4/1988 |
| JP | 63-140109 A | 6/1988 |
| JP | 3-69713 U | 7/1991 |
| JP | 8-42560 A | 2/1996 |
| JP | 2001-517288 A | 10/2001 |
| JP | 2004-301258 A | 10/2004 |
| JP | 2009-168205 A | 7/2009 |
| JP | 2011-179548 A | 9/2011 |
| JP | 2014-59234 A | 4/2014 |
| JP | 2014-167344 A | 9/2014 |
| NL | 289 635 A | 6/1965 |
| WO | WO 95/05547 A1 | 2/1995 |

OTHER PUBLICATIONS

English translation of the Written Opinion of the International Searching Authority (Forms PCT/IB/310 and PCT/ISA/237) dated Mar. 30, 2016, for International Application No. PCT/JP2015/052107.
International Search Report and Written Opinion of the International Searching Authority (Forms PCT/ISA/210, PCT/ISA/220 and PCT/ISA/237) dated May 12, 2015, for International Application No. PCT/JP2015/052107.
Extended European Search Report effective Jul. 1, 2016 issued in the corresponding EP Application No. 15823303.1.

* cited by examiner

FIG. 9A
FIG. 9B
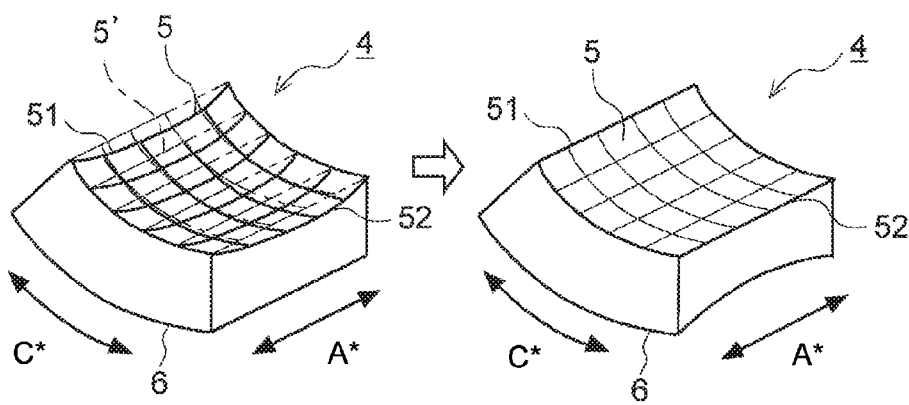
FIG. 10A
FIG. 10B
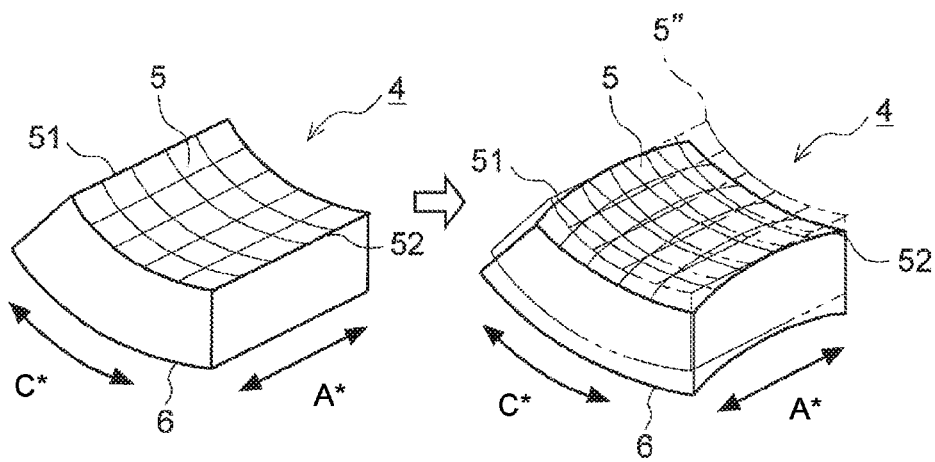
A* : AXIAL DIRECTION
C* : CIRCUMFERENTIAL DIRECTION

CIRCUMFERENTIAL DIRECTION

AXIAL DIRECTION

TILTING-PAD BEARING

TECHNICAL FIELD

The present disclosure relates to a tilting-pad bearing including a plurality of bearing pads each mounted to a casing pivotally about a pivot.

BACKGROUND ART

A tilting-pad bearing is generally known as a type of slide bearing. The tilting-pad bearing supports a rotor with a plurality of bearing pads disposed in the circumferential direction of the rotor. When the rotor rotates, an oil film is formed between the plurality of bearing pads and the rotor so as to secure a lubricating performance between the rotor and bearing surfaces. Further, the plurality of bearing pads are configured to be pivotable independently from one another, and thus the tilting-pad bearing is less likely to bring about unstable oscillation than other slide bearings and is even capable of stably supporting a high-speed rotor. For this reason, the tilting-pad bearing is widely used for rotary machines such as a turbine, a wind power machine, and a turbocharger.

For instance, Patent Document 1 discloses a tilting-pad bearing including a plurality of bearing pads each configured to be pivotable about a pivot on a back surface of the bearing pad. Further, Patent Document 2 describes a tilting-pad bearing formed so that the curvature of a bearing surface of a load-direction pad disposed at a position to receive a load is concentric with the center of the bearing.

CITATION LIST

Patent Literature

Patent Document 1: JP2009-168205A
Patent Document 2: JPS58-180816A

SUMMARY

Problems to be Solved

Meanwhile, in a tilting-pad bearing, the bearing load capacity is maintained to be high by drawing lubricant oil into a bearing gap between the inner circumferential surface of a bearing pad and the outer circumferential surface of the rotor and keeping an oil-film pressure of the wedge-shaped oil film formed between the surfaces at an appropriate pressure.

However, during operation of the tilting-pad bearing (during rotation of the rotor), the bearing load capacity may decrease due to deformation of the bearing pad caused by e.g. thermal deformation or pressure deformation. For instance, since the bearing pad is supported to a casing by a pivot on the back surface of the bearing pad, the bearing pad may be deformed by a pressing force from the pivot when receiving a load from the rotor. In another case, the bearing surface of the bearing pad slides on the rotor to generate friction heat, which may raise the temperature of the bearing surface, thus resulting in thermal expansion of the side of the bearing surface and in warp of the bearing pad. If the actual bearing gap becomes wider than a design gap due to deformation of the bearing pad during operation of the tilting-pad bearing as described above, there is a risk that the oil-film pressure decreases partially to reduce the bearing load capacity of the tilting-pad bearing.

Thus, it is required to maintain an appropriate oil-film pressure distribution of a bearing gap in a tilting-pad bearing.

In this regard, none of Patent Documents 1 and 2 discloses a configuration for maintaining an appropriate oil-film pressure distribution of a bearing gap in order to keep a high bearing load capacity.

In view of this, an object of at least one embodiment of the present invention is to provide a tilting-pad bearing whereby it is possible to maintain an appropriate oil-film pressure distribution of a bearing gap, and to keep a high bearing load capacity.

Solution to the Problems

As a result of the intensive researches conducted by the present inventors, it was found that an increase in the bearing gap due to deformation (e.g. thermal deformation or pressure deformation) of the bearing pad during operation of the tilting-pad bearing is even more remarkable in a downstream region of the bearing pad in the rotational direction of the rotor. Specifically, it was found that the bearing gap in the downstream region of the bearing pad widens because the bearing pad warps in such a direction that end portions of the bearing pad in the circumferential direction move away from the rotor in the downstream region of the bearing pad.

The bearing gap between the inner circumferential surface of the bearing pad and the outer circumferential surface of the rotor normally has a wedge shape which decreases in width from an upstream region toward a downstream region of the bearing pad. The oil-film pressure of the wedge-shaped oil film formed in the bearing gap tends to increase from the upstream region toward the downstream region. As described above, since the deformation of the bearing pad during operation of the tilting-pad bearing is remarkable in the downstream region, the bearing gap widens in the downstream region, where a high oil-film pressure is originally required, and the decrease in the oil-film pressure may bring about considerable reduction in the bearing load capacity. Thus, to keep a high bearing load capacity, the present inventors conducted further researches on the basis of the above finding to arrive at the present invention described below.

(1) A tilting-pad bearing according to at least one embodiment of the present invention is a tilting-pad bearing for rotatably supporting a rotor, and comprises: a casing; and a plurality of bearing pads each mounted to the casing pivotably about a pivot. Each of the plurality of bearing pads has a bearing pad surface facing the rotor, the bearing pad surface including a first region disposed on an upstream side in a rotational direction of the rotor and having a first curvature radius, and a second region disposed on a downstream side of the first region in the rotational direction and having a second curvature radius smaller than the first curvature radius.

As described above, the present inventors found that deformation of the bearing pad has two major characteristics. One is that the amount of deformation of the bearing pad during operation of the tilting-pad bearing varies between the upstream side and the downstream side, and the other one is that the downstream end portion of the bearing pad deforms to warp in a direction away from the rotor.

In the above configuration (1), the bearing pad surface includes the first region disposed on the upstream side in the rotational direction of the rotor and having the first curvature radius, and the second region disposed on the downstream side of the first region in the rotational direction and having the second curvature radius smaller than the first curvature radius. Specifically, since the curvature radius varies between the downstream side, where the amount of deformation of the bearing pad is large, and the upstream side, where the amount of deformation is small, it is easy to set an appropriate bearing gap corresponding to the amount of deformation of the bearing pad at each of the upstream side and the downstream side. Further, since the second curvature radius is smaller than the first curvature radius, it is possible to maintain the bearing gap at the downstream side even if the downstream end portion warps in a direction away from the rotor due to deformation of the bearing pad.

Thus, it is possible to maintain an appropriate oil-film pressure distribution of the bearing gap of the tilting-pad bearing and to keep a high bearing load capacity.

(2) In some embodiments, in the above configuration (1), a curvature center of the first region is disposed closer to an upstream end of the bearing pad than a curvature center of the second region is.

In this way, it is possible to make the gap between the rotor and the end of the bearing pad in the circumferential direction in the second region smaller than the gap between the rotor and the end in the circumferential direction of the bearing pad in the first region, and to maintain the oil-film pressure at the downstream side of the bearing pad.

(3) In some embodiments, in the above configuration (1) or (2), the first region and the second region are disposed adjacent to each other across a boundary which extends along an axial direction of the tilting-pad bearing, and the boundary is disposed outside a contact region where the bearing pad is in contact with the rotor while the rotor is stopped.

In a case where the first region and the second region are disposed next to each other, the changing point (boundary) between the first curvature radius and the second curvature radius has a pointed shape, and a high surface pressure may be applied to the changing point in response to a rotor load applied to the bearing pad when rotation of the rotor is stopped.

Thus, as in the above configuration (3), with the boundary between the first region and the second region disposed outside the contact region, where the bearing pad is in contact with the rotor in the stop time, it is possible to prevent a high surface pressure from being applied to the bearing pad locally when rotation of the rotor is stopped.

(4) In one embodiment, in the above configuration (3), the boundary is disposed on a downstream side of the contact region in the rotational direction.

With the above configuration (4), since the boundary between the first region and the second region is disposed on the downstream side of the contact region between the rotor and the bearing pad in the rotational direction, it is possible to prevent generation of a local surface pressure on the bearing pad while the rotor is stopped.

Further, if the installation range of the second region having the relatively small second curvature radius is too broad, it is difficult to set the second curvature radius whereby it is possible to avoid contact between the bearing pad and the outer circumferential surface of the rotor while maintaining the bearing gap to be appropriate. In this regard, with the above configuration (4), the installation range of the second region having the relatively small second curvature radius is limited to the downstream side of the contact region, which makes it easy to set the second curvature radius taking account of deformation of the downstream end portion of the bearing pad.

(5) In some embodiments, in any one of the above configurations (1) to (4), the first region and the second region are disposed adjacent to each other across a boundary which extends along an axial direction of the tilting-pad bearing, and the boundary is in a range excluding a range of from $(\theta_0-10°)$, to $(\theta_0+10°)$, where $\theta_0$ is an angular position of the pivot in a circumferential direction of the tilting-pad bearing.

With the above configuration (5), the boundary between the first region and the second region is disposed in a range excluding a range of from $(\theta_0-10°)$, to $(\theta_0+10°)$. Since the bearing pad is mounted to the casing about the pivot, the rotor contacts the bearing pad in a region centered at the pivot. Specifically, with the above configuration (4), the boundary is disposed avoiding a region where the bearing pad and the rotor are to be in contact at a high contact pressure. In this way, it is possible to prevent a high surface pressure from being applied to the bearing pad locally when rotation of the rotor is stopped.

(6) In one embodiment, in the above configuration (5), the boundary is in an angular range larger than $(\theta_0+10°)$.

With the above configuration (6), it is possible to prevent, more securely, a high surface pressure from being applied to the bearing pad locally when rotation of the rotor is stopped.

(7) In some embodiments, in any one of the above configurations (1) to (6), the bearing pad surface has a concave shape in an axial direction of the tilting-pad bearing at least when the rotor is stopped.

With the above configuration (7), it is possible to maintain the bearing gap to be appropriate even if the end portions in the axial direction warp in a direction away from the rotor due to deformation of the bearing pad, because the bearing pad surface is formed in a concave shape in the axial direction in advance.

(8) Further, a tilting-pad bearing according to at least one embodiment of the present invention is a tilting-pad bearing for rotatably supporting a rotor, and comprises: a casing; and a plurality of bearing pads each mounted to the casing pivotably about a pivot. Each of the plurality of bearing pads has a bearing pad surface formed in a concave shape in an axial direction of the tilting-pad bearing at least when the rotor is stopped.

With the above configuration (8), it is possible to maintain the bearing gap to be appropriate even if the end portions in the axial direction warp in a direction away from the rotor due to deformation of the bearing pad, because the bearing pad surface is formed in a concave shape in the axial direction in advance.

(9) In some embodiments, in the above configuration (7) or (8), the bearing-pad surface comprises a center region and end portions in the axial direction, and is formed in the concave shape such that the center region is positioned farther from the rotor than the end portions are.

With the above configuration (9), even if the end portions of the bearing pad deform to warp in a direction away from the rotor during operation of the tilting-pad bearing, it is possible to maintain the bearing pad to have a shape such that the bearing gap is maintained to be appropriate.

(10) In some embodiments, in any one of the above configurations (7) to (9), an amount of concave of the bearing pad surface in the axial direction is greater at a downstream side of the pivot than at an upstream side of the pivot in a rotational direction of the rotor.

During operation of the tilting-pad bearing, the bearing gap on the downstream side of the pivot becomes small. Thus, the temperature of the bearing pad surface on the downstream side of the pivot is likely to increase due to friction heat between the bearing pad surface and the lubricant oil trying to flow through the narrow bearing gap. Thus, at the downstream side, where the amount of deformation of the bearing pad is large, the amount of deformation due to thermal deformation of the bearing pad is relatively large.

In this regard, with the above configuration (10), it is possible to maintain the bearing gap to be appropriate at the downstream side, where the amount of deformation of the bearing pad is large.

Advantageous Effects

According to at least one embodiment of the present invention, it is possible to maintain an appropriate oil-film pressure distribution of the bearing gap of the tilting-pad bearing and to keep a high bearing load capacity.

BRIEF DESCRIPTION OF DRAWINGS

FIGS. 9A and 9B are each a perspective view illustrating a bearing pad according to another embodiment.

FIGS. 10A and 10B are each a perspective view illustrating a bearing pad according to a comparative example.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
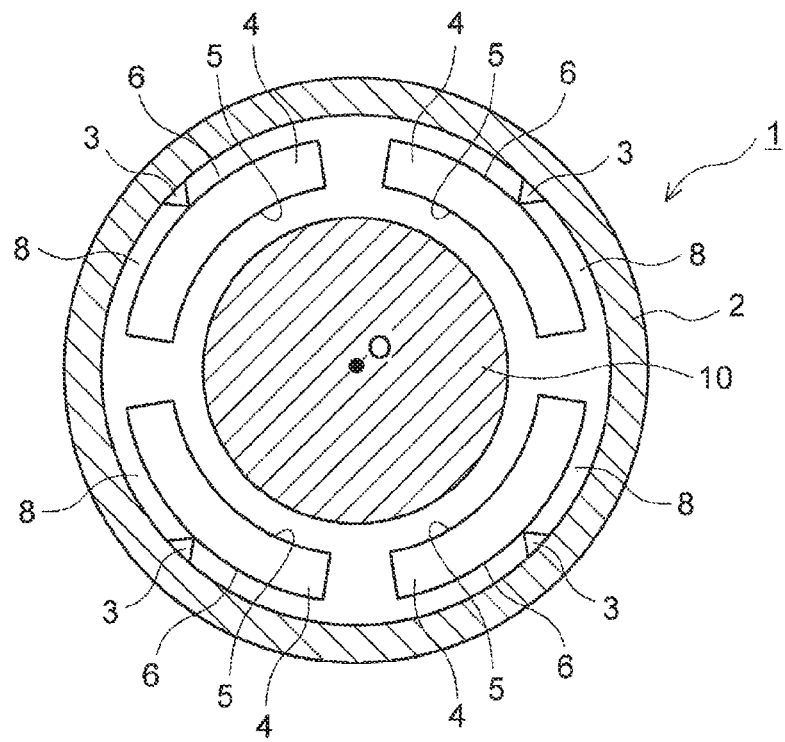
FIG. 1 is a cross-sectional view illustrating a schematic configuration of a tilting-pad bearing according to some embodiments.

First, with reference to FIG. 1, the overall configuration of a tilting-pad bearing 1 according to some embodiments will be described. FIG. 1 is a cross-sectional view illustrating a schematic overall configuration of the tilting-pad bearing 1 according to some embodiments. The cross section illustrated in the drawing is orthogonal to the axis O of a rotor 10 extending from the front to the back of the drawing. The axis O of the rotor 10 may coincide with the axis of the tilting-pad bearing 1.

The tilting-pad bearing 1 according to the present embodiment is a type of slide bearing and is configured to support the rotor 10 of a rotary machine rotatably. The tilting-pad bearing 1 is a journal bearing for supporting a load in the radial direction of the rotor 10, for instance. The tilting-pad bearing 1 of the present embodiment may be applied to rotary machines including a turbine such as a steam turbine, a gas turbine, and a turbine for driving a machine, a wind power machine such as a wind turbine generator, and a turbocharger, for instance.

As illustrated in FIG. 1, in some embodiments, the tilting-pad bearing 1 includes a casing 2 on a fixed side, and a plurality of bearing pads 4 each mounted to the casing 2 pivotally about a pivot 3.

The casing 2 is formed in an annular shape so that the rotor 10 is insertable through the casing 2. The plurality of bearing pads 4 is disposed on the inner circumferential surface of the casing 2.

The bearing pads 4 are disposed separate from one another in the circumferential direction of the casing 2, i.e., along an outer circumferential surface of the rotor 10. In the example illustrated in FIG. 1, four bearing pads 4 are disposed in the circumferential direction of the casing 2. However, the number and position of the bearing pads 4 are not limited thereto, and six or eight bearing pads 4 may be disposed in the circumferential direction of the casing 2, for instance.

Each of the bearing pads 4 is configured to be pivotable at least in the circumferential direction of the casing 2 about corresponding one of the pivots 3. Further, each of the bearing pads 4 may be configured to be pivotable in the circumferential direction and the axial direction of the casing 2. The pivot 3 may be disposed on the downstream side of the center position of the bearing pad 4 in the circumferential direction. In the present embodiment, the circumferential direction of the bearing pad 4 refers to the same direction as the circumferential direction of the rotor 10 and the circumferential direction of the tilting-pad bearing 1.

Each of the bearing pads 4 includes a bearing pad surface 5 facing the rotor 10 and a back surface 6 facing the casing 2.

Lubricant oil is supplied to a bearing gap 8 between the bearing pad surface 5 of each of the bearing pads 4 and the outer circumferential surface of the rotor 10. To supply the lubricant oil, oil bath lubrication or direct lubrication is used, for instance. Oil bath lubrication is a method of filling the interior of the casing 2 with lubricant oil to immerse sliding parts between the bearing pads 4 and the rotor 10 in the lubricant oil. Direct lubrication is a method of directly supplying lubricant oil to the sliding parts between the bearing pads 4 and the rotor 10 using nozzles each disposed between adjacent two of the bearing pads 4. As a modification method of direct lubrication, lubricant oil may be directly supplied to the sliding parts between the bearing pads 4 and the rotor 10 via oil-supply holes formed on the bearing pads 4. Alternatively, the above methods may be combined to supply oil.

Figure 2A:
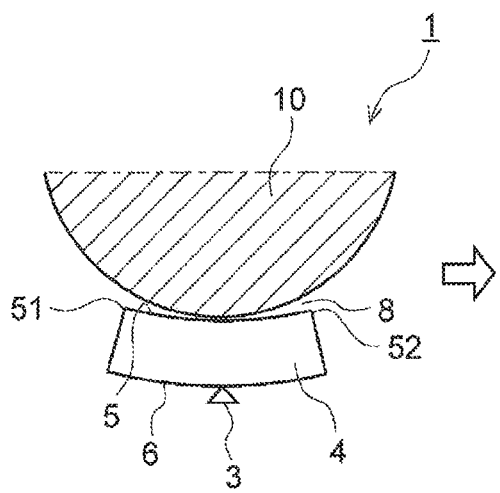
FIGS. 2A and 2B are each a partial cross-sectional view illustrating a schematic configuration of a tilting-pad bearing according to a comparative example.
Figure 2B:
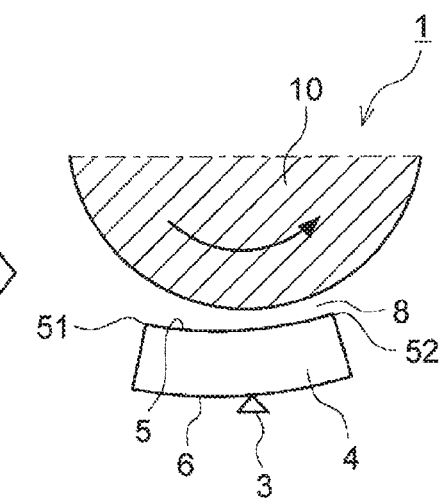

FIGS. 2A and 2B are each a partial cross-sectional view illustrating a schematic configuration of a tilting-pad bearing according to a comparative example. FIG. 2A illustrates a tilting-pad bearing in a stop time and FIG. 2B illustrates a tilting-pad bearing in an operation time. In FIGS. 2A and 2B, only one bearing pad 4 is depicted, whereas other bearing pads 4 are not. A stop time refers to the time when the rotor 10 is stopped, and an operation time refers to the time when the rotor 10 is rotating.

As illustrated in FIG. 2A, in the stop time of the tilting-pad bearing 1, (when the rotor 10 is stopped), the bearing gap 8 between an upstream end portion 51 of the bearing pad surface 5 and the outer circumferential surface of the rotor 10 and the bearing gap 8 between a downstream end portion 52 of the bearing pad surface 5 and the outer circumferential surface of the rotor 10 are maintained to have a predetermined interval. The upstream end portion 51 is an end portion of the bearing pad surface 5 on the upstream side in the rotational direction of the rotor 10 (direction of the arrow in FIG. 2B), and the downstream end portion 52 is an end portion of the bearing pad surface 5 on the downstream side in the rotational direction of the rotor 10 (direction of the arrow in FIG. 2B).

As illustrated in FIG. 2B, in the operation time of the tilting-pad bearing 1, (when the rotor 10 is rotating), lubricant oil is drawn into the bearing gap 8 between the bearing pad surface 5 of the bearing pad 4 and the outer circumferential surface of the rotor 10 from the side of the upstream end portion 51 due to rotation of the rotor 10, and thereby a wedge-shaped oil film is formed in the bearing gap 8. At this time, the bearing pad 4 tilts about the pivot 3, and thus the bearing gap 8 between the upstream end portion 51 of the bearing pad surface 5 and the outer circumferential surface of the rotor 10 widens as compared to that in the stop time, and the bearing gap 8 between the downstream end portion 52 of the bearing pad surface 5 and the outer circumferential surface of the rotor 10 narrows as compared to that in the stop time.

Figure 3A:
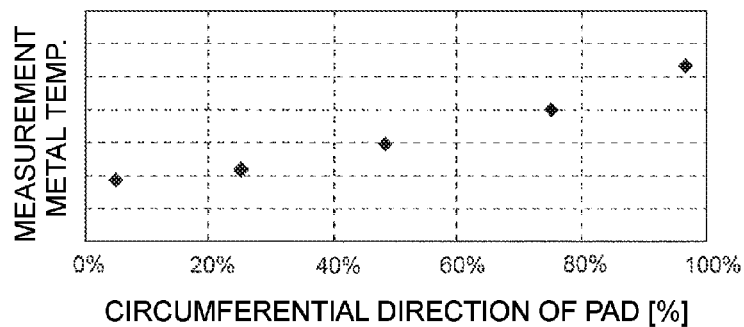
FIG. 3A is a graph showing a measurement metal temperature distribution with respect to the circumferential-direction position of the bearing pad.
Figure 3B:
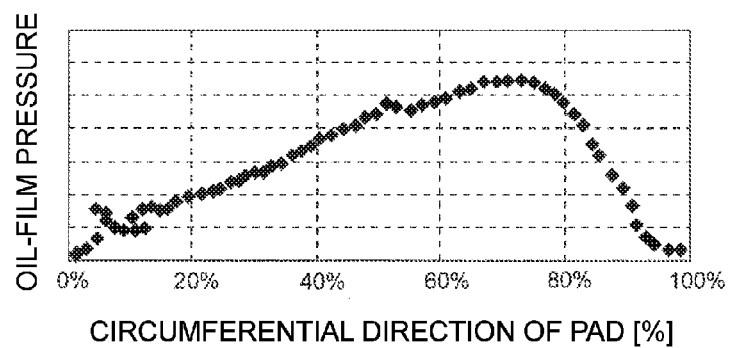
FIG. 3B is a graph showing an oil-film pressure distribution with respect to the circumferential-direction position of the bearing pad.
Figure 3C:
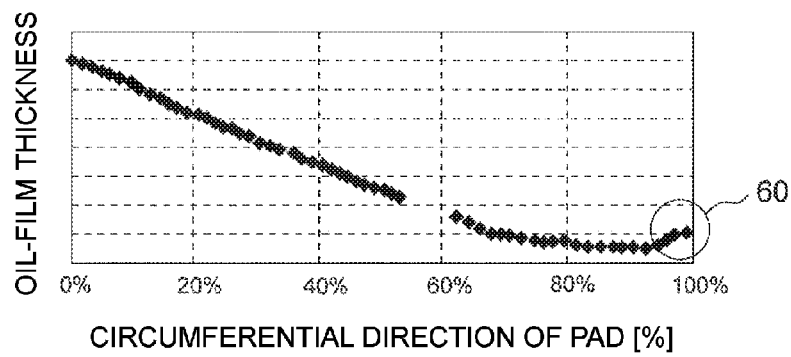
FIG. 3C is a graph showing an oil-film thickness distribution (bearing gap distribution) with respect to the circumferential-direction position of the bearing pad.

Now, with reference to FIGS. 3A to 3C, an example of each state value of the tilting-pad bearing 1 in the operation time illustrated in FIG. 2B will be described. In FIGS. 3A to 3C, actual measurement values obtained by measurement are shown as the state values. FIG. 3A is a graph showing a measurement metal temperature distribution with respect to the circumferential-direction position of the bearing pad. FIG. 3B is a graph showing an oil-film pressure distribution with respect to the circumferential-direction position of the bearing pad. FIG. 3C is a graph showing an oil-film thickness distribution (bearing gap distribution) with respect to the circumferential-direction position of the bearing pad. In FIGS. 3A to 3C, the 0% position in the circumferential direction of the pad corresponds to the position of the upstream end portion 51, and the 100% position in the circumferential direction of the pad corresponds to the position of the downstream end portion 52.

As illustrated in FIG. 3A, the measurement metal temperature of the bearing pad 4 is higher at the side of the downstream end portion 52 than at the side of the upstream end portion 51 in the circumferential direction of the pad. Further, as illustrated in FIG. 3B, the oil-film pressure of the bearing gap 8 is higher at the side of the downstream end portion 52 than at the side of the upstream end portion 51 in the circumferential direction of the pad. Still further, as illustrated in FIG. 3C, the oil-film thickness of the bearing gap 8 is the greatest at the upstream end portion 51 and gradually decreases toward the downstream end portion 52, in the circumferential direction of the pad, and a wedge-shaped oil film is formed in the bearing gap 8. Specifically, the lubricant oil is drawn into the bearing gap 8 by rotation of the rotor 10, so that the bearing gap 8 has a wedge shape. The bearing gap 8 having an appropriate wedge shape normally maintains the oil-film pressure of the bearing gap 8 to be appropriate and keeps the bearing load capacity of the tilting-pad bearing 1 to be high.

Meanwhile, if the bearing gap 8 of the bearing pad 4 at the side of the downstream end portion 52 narrows and the oil-film thickness decreases at the side of the downstream end portion 52, the measurement metal temperature at the side of the downstream end portion 52 increases. A temperature increase of the bearing pad 4 brings about thermal deformation of the bearing pad 4.

Besides the thermal deformation, pressure deformation may also be the cause of deformation of the bearing pad 4. Specifically, the bearing pad 4 is supported by the pivot 3 at the back surface 6, and the part other than the pivot 3 is free. Thus, when a pressure is applied to the bearing pad surface 5, the part other than the pivot 3 may warp in a direction away from the rotor 10.

As described above, due to the deformation of the bearing pad 4 caused by thermal deformation or pressure deformation, the bearing gap 8 may fail to have an appropriate wedge shape in the operation time, and particularly in the region at the side of the downstream end portion 52 indicated by the reference numeral 60 in FIG. 3C, the bearing gap 8 may become larger than a design value.

Figure 4:
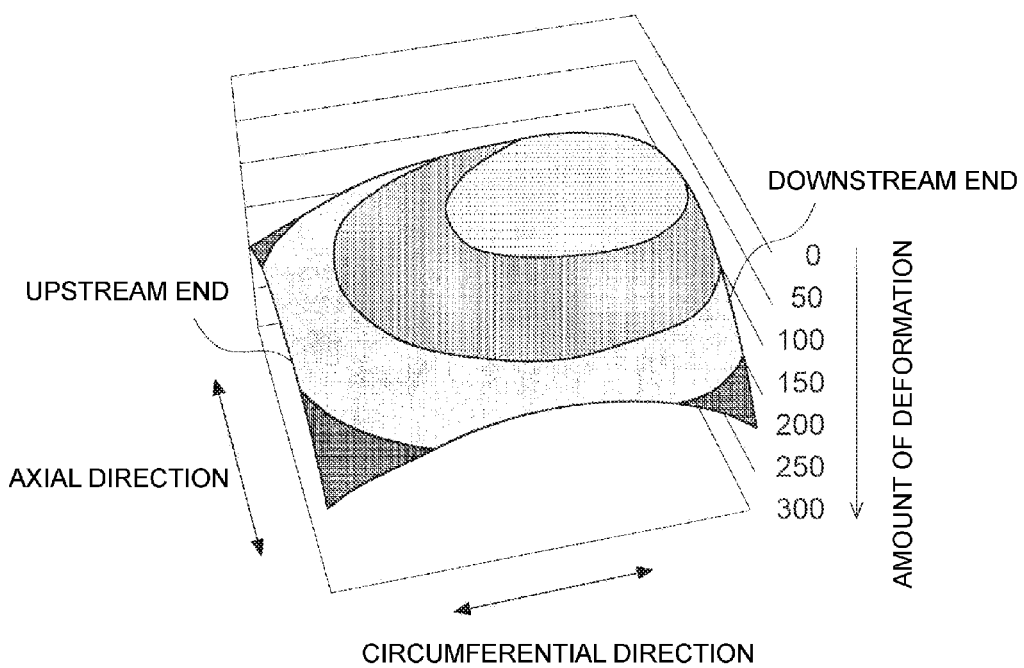
FIG. 4 is a diagram illustrating a deformation distribution of a bearing-pad surface.

FIG. 4 is a diagram illustrating a deformation distribution of the bearing-pad surface 5 obtained by the FEM analysis. The drawing shows a distribution of the amount of deformation of the bearing pad surface 5 in the tilting-pad bearing 1 in the operation time illustrated in FIG. 2B. The amount of deformation is an absolute value representing a change in the position of the bearing pad surface 5 in the operation time relative to the bearing pad surface 5 in the stop time, in the thickness direction of the bearing pad surface 5. When the amount of deformation is zero, it means that the position of the bearing pad surface 5 in the operation time has not changed from that in the stop time. A region where the amount of deformation is close to zero at the substantially center part of the bearing pad surface 5 is the support point of the pivot 3 and its peripheral region, and is less deformed because the back surface 6 is supported by the pivot 3.

As illustrated in FIG. 4, with regard to the bearing pad surface 5 in the operation time, the side of the downstream end portion 52 warps about the support point of the pivot 3, and the bearing pad surface 5 becomes a curved surface protruding toward the rotor 10. The change rate is especially great at the side of the downstream end portion 52, and the bearing gap 8 is wide in the downstream region of the bearing pad 4. The increase in the bearing gap 8 in the downstream region of the bearing pad 4 can be seen in the region at the side of the downstream end portion 52 indicated by the reference numeral 60 in the bearing gap distribution illustrated in FIG. 3C.

As described above, the bearing gap 8 between the bearing pad surface 5 and the outer circumferential surface of the rotor 10 in the operation time has a wedge shape. However, if the bearing gap 8 widens in the downstream region, where a high oil-film pressure is originally required, due to deformation of the bearing pad 4 caused by thermal deformation or pressure deformation, the bearing load capacity of the tilting-pad bearing 1 may decrease considerably.

Thus, the tilting-pad bearing 1 according to the present embodiment further includes the following configuration to maintain a high bearing load capacity.

Figure 5A:
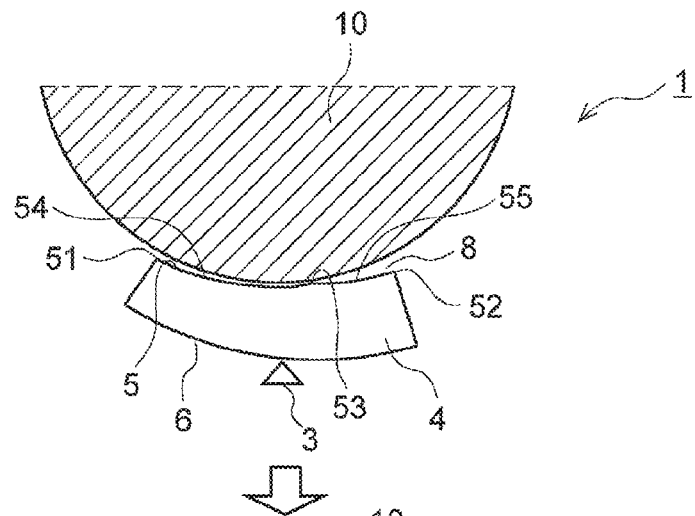
FIG. 5 is a partial cross-sectional view illustrating a tilting-pad bearing according to one embodiment.
Figure 5B:
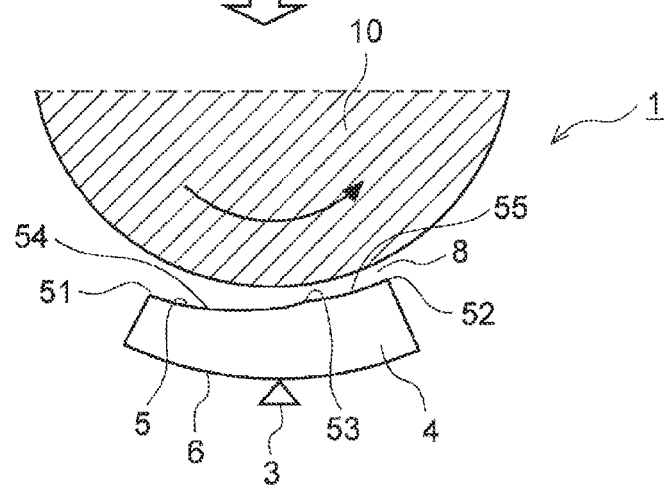
Figure 5C:
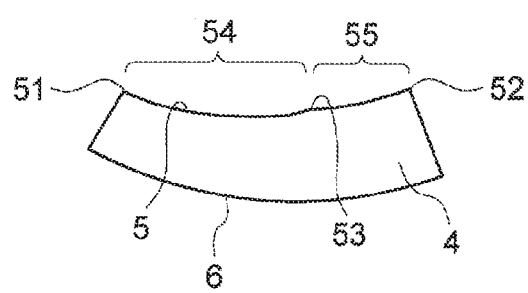

FIGS. 5A to 5C are each a partial cross-sectional view illustrating the tilting-pad bearing 1 according to one embodiment. FIG. 5A illustrates the tilting-pad bearing 1 in the stop time, FIG. 5B illustrates the tilting-pad bearing 1 in the operation time, and FIG. 5C illustrates a cross section of the bearing pad 4. In FIGS. 5A and 5B, one bearing pad 4 is depicted, whereas other bearing pads 4 are not. The cross sections illustrated in the drawings are orthogonal to the axis O (see FIG. 1) of the rotor 10 extending from the front to the back of the drawings.

In one embodiment, the tilting-pad bearing 1 is configured such that the bearing pad surface 5 of the bearing pad 4 includes the first region 54 disposed on the upstream side in the rotational direction of the rotor 10 (the direction of the arrow in the drawing) and having the first curvature radius, and the second region 55 disposed on the downstream side of the first region 54 in the rotational direction and having the second curvature radius smaller than the first curvature radius.

Specifically, the bearing pad 4 includes the bearing pad surface 5 curved along the outer circumferential surface of the rotor 10 and the back surface 6 curved along the inner circumferential surface of the casing 2. The bearing pad surface 5 includes at least the first region 54 having the first curvature radius and the second region 55 having the second curvature radius smaller than the first curvature radius. In the example illustrated in FIG. 5, the bearing pad surface 5 has a configuration in which two regions having different curvature radii from each other are disposed adjacently across a boundary 53. However, in unillustrated example, the bearing pad surface 5 may include three or more regions having different curvature radii. For instance, the bearing pad surface 5 includes the first region including the upstream end portion 51, the second region including the downstream end portion 52, and the third region disposed between the first region and the second region in the circumferential direction. In this case, the curvature radius of the third region may be between the curvature radius of the first region and the curvature radius of the second region.

Further, the curvature centers of the first region 54 and the second region 55 are both at the side of the rotor 10.

Similarly, the back surface 6 of the bearing pad 4 is curved in the circumferential direction so as to have such a curvature radius that the curvature center is at the side of the rotor 10. Since the back surface 6 is formed along the casing 2, the back surface 6 may have a constant curved surface so that there is one curvature radius in the circumferential direction.

Further, in a case where the first region 54 is positioned so as to include the upstream end portion 51 and the second region 55 is positioned so as to include the downstream end portion 52, the tilting-pad bearing 1 may be configured such that, in the stop time, the bearing gap 8 between the upstream end portion 51 and the rotor 10 is greater than the bearing gap 8 between the downstream end portion 52 and the rotor 10.

As described above, the present inventors found that deformation of the bearing pad 4 has two major characteristics. One is that the amount of deformation of the bearing pad 4 during operation of the tilting-pad bearing 1 varies between the upstream side and the downstream side, and the other one is that the downstream end portion 52 of the bearing pad surface 5 deforms to warp in a direction away from the rotor 10.

In the above embodiment, the bearing pad surface 5 includes the first region 54 disposed on the upstream side in the rotational direction of the rotor 10 and having the first curvature radius, and the second region 55 disposed on the downstream side of the first region 54 in the rotational direction and having the second curvature radius smaller than the first curvature radius. Specifically, since the curvature radius varies between the downstream side, where the amount of deformation of the bearing pad 4 is large, and the upstream side, where the amount of deformation is small, it is easy to set an appropriate bearing gap 8 corresponding to the amount of deformation of the bearing pad 4 at each of the upstream side and the downstream side. Further, since the second curvature radius is smaller than the first curvature radius, it is possible to maintain the bearing gap 8 at the downstream side to be appropriate even if the downstream end portion 52 warps in a direction away from the rotor 10 due to deformation of the bearing pad 4.

Thus, it is possible to maintain an oil-film pressure distribution of the bearing gap 8 of the tilting-pad bearing 1 to be appropriate and to keep the bearing load capacity of the tilting-pad bearing 1 to be high.

Figure 6A:
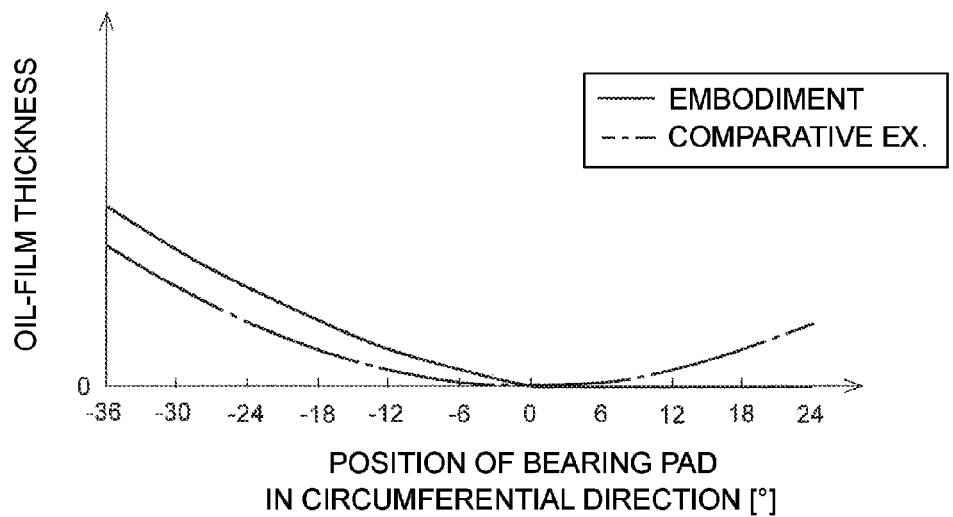
FIG. 6A is a graph showing an oil-film thickness of the tilting-pad bearing in the present embodiment and a comparative example during a stop time.
Figure 6B:
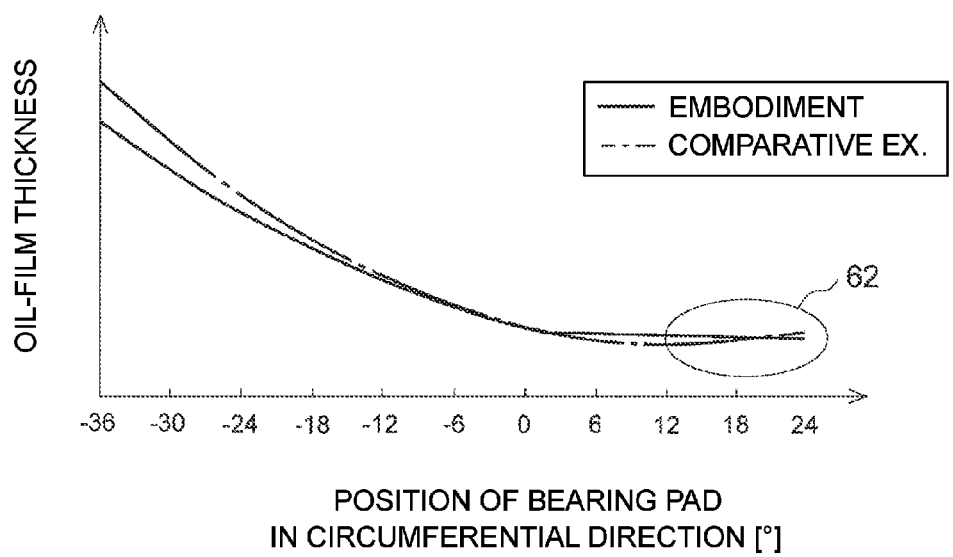
FIG. 6B is a graph showing an oil-film thickness of the tilting-pad bearing in the present embodiment and a comparative example during an operation time.

FIGS. 6A and 6B are graphs comparing the oil-film thickness of the tilting-pad bearing 1 in the embodiment illustrated in FIG. 5 with that of the tilting-pad bearing 1 in the comparative example illustrated in FIG. 2, during the stop time and the operation time, respectively. FIG. 6A is a graph showing the oil-film thickness of the tilting-pad bearing 1 in the present embodiment and the comparative example during the stop time. FIG. 6B is a graph showing the oil-film thickness of the tilting-pad bearing 1 in the present embodiment and the comparative example during the operation time. In FIGS. 6A and 6B, the circumferential-direction position of the bearing pad is 0° at the pivot position, negative at the side of the upstream end portion 51, and positive at the side of the downstream end portion 52.

As illustrated in FIG. 6A, during the stop time of the tilting-pad bearing 1, the tilting-pad bearing 1 of the comparative example has an oil-film thickness that reaches its minimum at 0°, which is the pivot position, and increases toward the upstream end portion 51 and the downstream end portion 52. The oil-film thickness is greater at the upstream end portion 51 than at downstream end portion 52. The tilting-pad bearing 1 of the present embodiment has an oil-film thickness that reaches its minimum at 0°, which is the pivot position, and increases toward the upstream end portion 51 but stays at a substantially constant value at the side of the downstream end portion 52. Also in the tilting-pad bearing 1 of the embodiment, the oil-film thickness is greater at the upstream end portion 51 than at the downstream end portion 52.

As illustrated in FIG. 6B, during the operation time of the tilting-pad bearing 1, the tilting-pad bearing 1 in the comparative example has an oil-film thickness that decreases toward the downstream end portion 52 from the upstream end portion 51 and the oil-film has a substantially wedge shape, but the oil-film thickness increases in the vicinity of the downstream end portion 52 indicated by the reference numeral 62. In contrast, the tilting-pad bearing 1 in the present embodiment has an oil-film thickness that decreases toward the downstream end portion 52 from the upstream end portion 51, but does not increase in the vicinity of the downstream end portion 52 indicated by the reference numeral 62, and the oil-film thickness is substantially constant in the vicinity of the downstream end portion 52.

Also from the above graphs, it is clear that according to the present embodiment it is possible to maintain an appropriate oil-film pressure distribution of the bearing gap 8 in the tilting-pad bearing 1 and to keep a high bearing load capacity of the tilting-pad bearing 1.

In one embodiment, the curvature center of the first region 54 is disposed closer to the upstream end of the bearing pad 4 than the curvature center of the second region 55 is.

According to the above embodiment, it is possible to make the bearing gap 8 between the rotor 10 and the end (in the configuration example illustrated in FIG. 5, the downstream end portion 52) of the bearing pad 4 in the circumferential direction in the second region 55 smaller than the bearing gap 8 between the rotor 10 and the end (in the configuration example illustrated in FIG. 5, the upstream end portion 51) in the circumferential direction of the bearing pad 4 in the first region 54, and to maintain the oil-film pressure at the downstream side of the bearing pad 4.

Further, with regard to the positional relationship between the rotor 10 and the bearing pad 4 in the operation time, the curvature center of the second region may be configured such that the curvature center of the second curvature radius coincides with the axis O (see FIG. 1) of the rotor 10. In this way, in the operation time of the tilting-pad bearing 1, it is easier to set the bearing gap between the rotor 10 and the end of the bearing pad 4 in the circumferential direction in the second region 55 to an appropriate size.

Figure 7:
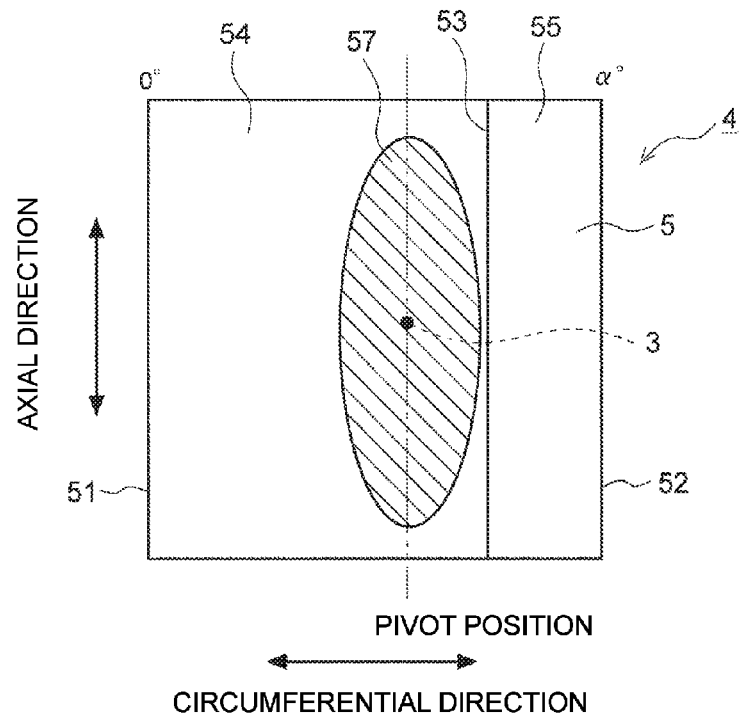
FIG. 7 is a planar view illustrating a bearing pad according to one embodiment.

FIG. 7 is a planar view illustrating the bearing pad 4 according to one embodiment. The drawing is a view of the bearing pad 4 as seen from the bearing pad surface 5. The pivot 3 is disposed on the back surface 6 not illustrated in the drawing, and thus should not appear in the drawing. However, to help understanding, the support point of the pivot 3 is depicted.

As illustrated in FIG. 7, in one embodiment, the first region 54 and the second region 55 are disposed adjacently across a boundary 53 along the axial direction of the tilting-pad bearing 1, and the boundary 53 is disposed outside a contact region 57 where the bearing pad 4 contacts the rotor 10 in the stop time. In the illustrated example, the boundary 53 is formed linearly along the axial direction. However, the boundary 53 may be formed in a linear shape oblique to the axial direction, or in a curve shape substantially along the axial direction.

In a case where the first region 54 and the second region 55 are disposed next to each other, the changing point (boundary 53) between the first curvature radius and the second curvature radius has a pointed shape, and a high surface pressure may be applied to the changing point in response to a rotor load applied to the bearing pad 4 when rotation of the rotor 10 is stopped. Thus, as in the above embodiment, with the boundary 53 between the first region 54 and the second region 55 disposed outside the contact region 57, where the bearing pad 4 is in contact with the rotor 10 in the stop time, it is possible to prevent a high surface pressure from being applied to the bearing pad 4 locally when rotation of the rotor 10 is stopped. Further, whereas the boundary 53 does not contact the rotor 10 during operation because the bearing pad 4 is tilting about the pivot 3, there is a high risk that the boundary 53 contacts the rotor 10 during the stop time. Thus, with the boundary 53 disposed outside the contact region 57, where the bearing pad 4 contacts the rotor 10 in the stop time as in the above embodiment, it is possible to prevent contact between the boundary 53 and the rotor 10 securely.

The boundary 53 between the first region 54 and the second region 55 may be disposed on the downstream side of the contact region 57 in the rotational direction. In this way, with the boundary 53 disposed on the downstream side of the contact region 57 between the rotor 10 and the bearing pad 4 in the rotational direction, it is possible to prevent generation of a local surface pressure on the bearing pad 4 in the stop time. Further, if the installation range of the second region 55 having the relatively-small second curvature radius is too broad, it is difficult to set the second curvature radius whereby it is possible to avoid contact between the bearing pad 4 and the outer circumferential surface of the rotor 10 while maintaining the bearing gap 8 to be appropriate. In this regard, with the above configuration, the installation range of the second region 55 having the relatively-small second curvature radius is limited to the downstream side of the contact region 57, which makes it easy to set the second curvature radius appropriately taking account of deformation of the downstream end portion 52 of the bearing pad 4.

Figure 8:
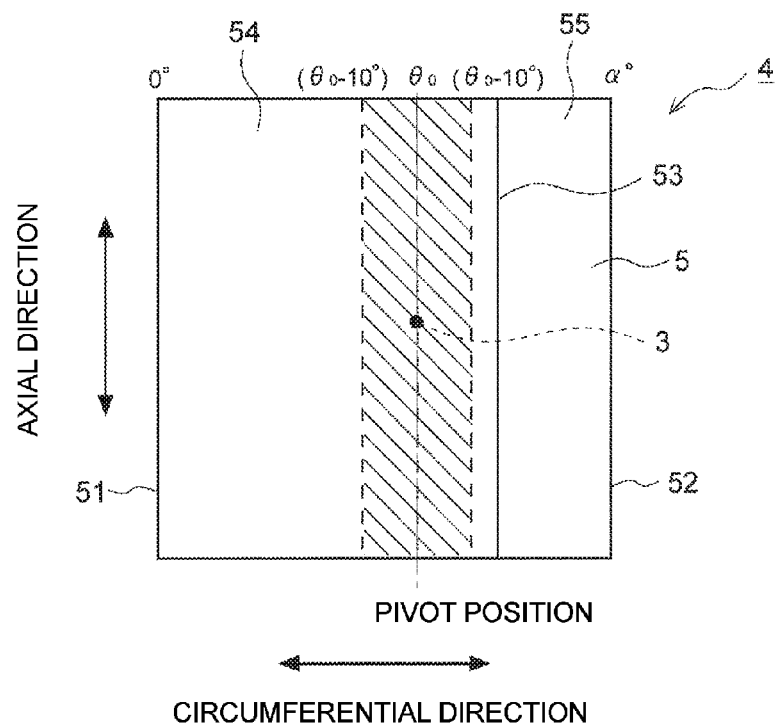
FIG. 8 is a planar view illustrating a bearing pad according to another embodiment.

FIG. 8 is a planar view illustrating a bearing pad according to another embodiment. The drawing is a view of the bearing pad 4 as seen from the bearing pad surface 5. The pivot 3 is disposed on the back surface 6 not illustrated in the drawing and thus should not appear in the drawing. However, to help understanding, the support point of the pivot 3 is depicted.

In another embodiment, the first region 54 and the second region 55 are disposed adjacently across the boundary 53 along the axial direction of the tilting-pad bearing 1, and the boundary 53 is disposed in a range excluding a range of from $(\theta_0-10°)$, to $(\theta_0+10°)$, where $\theta_0$ is the angular position of the pivot in the circumferential direction. Specifically, the boundary 53 is disposed in a range excluding the shaded region in FIG. 8.

In the above embodiment, the boundary 53 between the first region 54 and the second region 55 is disposed in a range excluding a range of from $(\theta_0-10°)$, to $(\theta_0+10°)$. Since the bearing pad 4 is mounted to the casing 2 (see FIG. 1) about the pivot 3, the rotor 10 contacts the bearing pad 4 in a region centered at the pivot 3. Specifically, according to the above embodiment, the boundary 53 is disposed avoiding a region where the bearing pad 4 and the rotor 10 are to be in contact at a high contact pressure. In this way, it is possible to prevent a high surface pressure from being applied to the bearing pad 4 locally when rotation of the rotor 10 is stopped.

In this case, the boundary 53 between the first region 54 and the second region 55 may be disposed in an angular range larger than $(\theta_0+10°)$. In FIG. 8, the angular range larger than) $(\theta_0+10°)$ is a range on the right side of the boundary 53.

Besides the above embodiment, the tilting-pad bearing 1 according to the present embodiment may further include the following configuration to maintain a high bearing load capacity.

FIG. 9 is a perspective view of the bearing pad 4 in another embodiment. FIG. 9A illustrates the bearing pad 4 in the stop time and FIG. 9B illustrates the bearing pad 4 in the operation time. Specifically, FIG. 9B illustrates the bearing pad 4 after deformation due to thermal deformation and pressure deformation.

As illustrated in FIG. 9A, the bearing pad 4 according to another embodiment is configured such that the bearing pad surface 5 has a concave shape in the axial direction of the tilting-pad bearing 1, at least in the stop time of the rotor 10. In the drawing, a bearing pad surface 5' not formed in a concave shape is depicted for comparison. The bearing pad surface 5' is represented by imaginary lines as being formed linearly in the axial direction. In contrast, the bearing pad 4 according to another embodiment is configured such that the bearing pad surface 5 has a concave shape in the axial direction of the tilting-pad bearing 1, in a cross section along the axial direction. At this time, the bearing pad surface 5 may have an amount of concave that is set in accordance with the amount of deformation of the bearing pad 4 due to thermal deformation and pressure deformation. For instance, as illustrated in FIG. 4, the amount of concave may be set for each position in the circumferential direction or the axial direction of the bearing pad surface 5 on the basis of a deformation distribution of the bearing pad surface 5 obtained in advance by the FEM analysis or the like.

According to the above embodiment, it is possible to maintain the bearing gap 8 to be appropriate even if the end portions in the axial direction warp in a direction away from the rotor 10 due to deformation of the bearing pad 4, because the bearing pad surface 5 is formed in a concave shape in the axial direction in advance.

FIGS. 10A and 10B are each a perspective view of the bearing pad 4 in a comparative example. FIG. 10A illustrates the bearing pad 4 in the stop time and FIG. 10B illustrates the bearing pad 4 in the operation time.

As illustrated in FIG. 10A, in a case where the bearing pad surface 5 is not formed in a concave shape but formed in a linear shape in the axial direction, the sides of the end portions warp centered at the pivot 3 in the operation time as illustrated in FIG. 10B, due to deformation of the bearing pad 4 caused by thermal deformation and pressure deformation (see FIG. 4). In this regard, in the present embodiment described above, the bearing pad surface 5 has a concave shape in the axial direction of the tilting-pad bearing 1, at least in the stop time of the rotor 10, which makes it possible to maintain the bearing gap 8 to be appropriate.

Further, the bearing pad surface 5 may be formed in a concave shape such that a center region is disposed farther from the rotor 10 than the end portions in the axial direction are.

In this way, even if the end portions of the bearing pad 4 deform to warp in a direction away from the rotor 10 during operation of the tilting-pad bearing 1, it is possible to maintain the bearing pad 4 to have a shape such that the bearing pad 8 is kept appropriate.

Figure 11A:
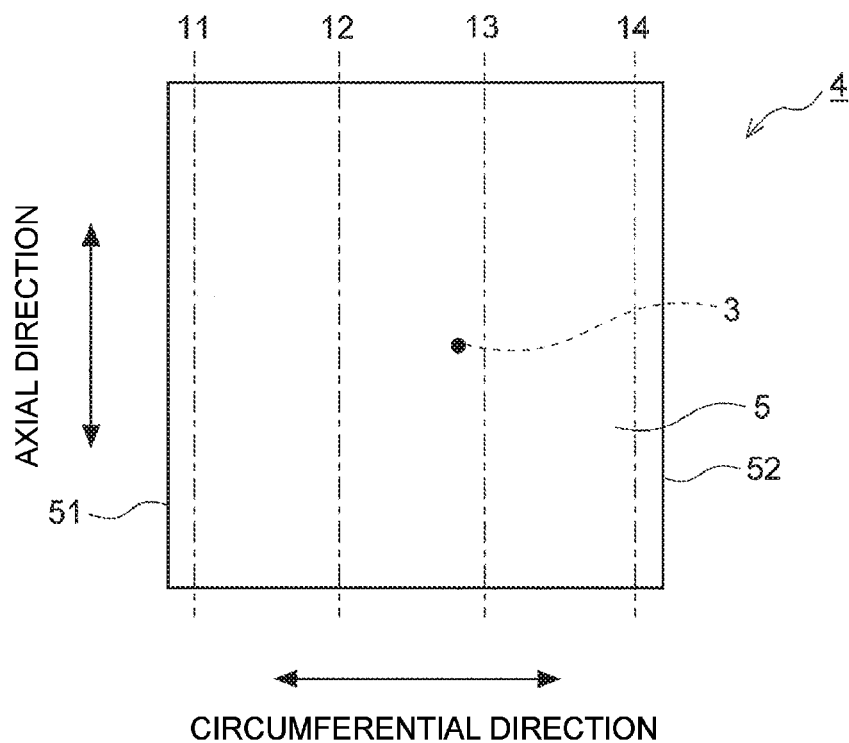
FIG. 11A is a planar view illustrating a bearing pad according to another embodiment.
Figure 11B:
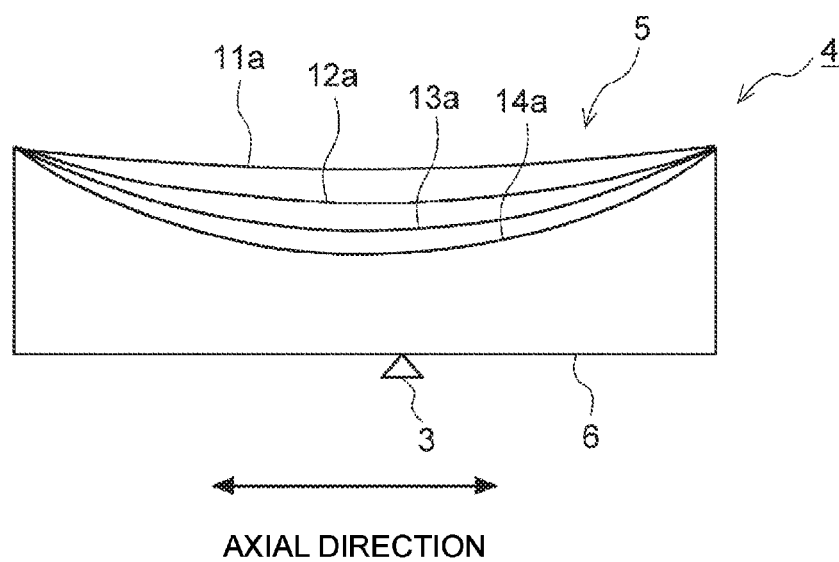
FIG. 11B is a diagram illustrating cross sections of a bearing pad at respective cutting planes in FIG. 11A.

FIG. 11A is a planar view illustrating the bearing pad 4 according to another embodiment. The drawing is a view of the bearing pad 4 as seen from the bearing pad surface 5. Thus, the pivot 3 is disposed on the back surface 6 not illustrated in the drawing and thus should not appear in the drawing. However, to help understanding, the support point of the pivot 3 is depicted. FIG. 11B is a diagram illustrating cross sections of the bearing pad 4 at respective cutting planes 11 to 14 in FIG. 11A. Specifically, the cutting planes 11 to 14 are positioned in order from the side of the upstream end portion 51 to the side of the downstream end portion 52 in FIG. 11A. In other words, the cutting plane 11 is the closest to the upstream end portion 51 and the cutting plane 14 is the closest to the downstream end portion 52, among the cutting planes. Each of the cutting planes 11 to 14 is a cross section along the axial direction. In FIG. 11B, the bearing pad surface 11a is the bearing pad surface 5 in a cross section of the bearing pad 4 taken along the cutting plane 11, the bearing pad surface 12a is the bearing pad surface 5 in a cross section of the bearing pad 4 taken along the cutting plane 12, the bearing pad surface 13a is the bearing pad surface 5 in a cross section of the bearing pad 4 taken along the cutting plane 13, and the bearing pad surface 14a is the bearing pad surface 5 in a cross section of the bearing pad 4 taken along the cutting plane 14. Among the cutting planes 11 to 14, the cutting planes 11, 12 are disposed on the upstream side of the pivot 3, and the cutting planes 13, 14 are disposed on the downstream side of the pivot 3.

As illustrated in FIGS. 11A and 11B, the bearing pad 4 in another embodiment is configured such that the amount of concave in the axial direction of the bearing pad surface 5 is larger at the downstream side of the pivot 3 in the rotational direction than at the upstream side of the pivot 3 in the rotational direction. In the example illustrated in the drawings, the amount of concave gradually increases in the axial direction of the bearing pad surface 5 from the upstream side toward the downstream side of the bearing pad 4. The amount of concave of the bearing pad surface 5 in each cutting plane is not limited to the present configuration. Specifically, the magnitude relationship of the amount of concave between the bearing pad surfaces 11a, 12a of the cutting planes 11, 12 on the upstream side of the pivot 3 is not limited. Similarly, the magnitude relationship of the amount of concave between the bearing pad surfaces 13a, 14a of the cutting planes 13, 14 on the downstream side of the pivot 3 is not limited. For instance, the bearing pad surface 13a at the cutting plane 13 closer to the upstream side than the bearing pad surface 14a of the cutting plane 14 at the most downstream side is may have a larger amount of concave in the axial direction. Still, also in these cases, a relationship is maintained that the amount of concave of the bearing pad surface 5 at a downstream position of the pivot 3 is larger than the amount of concave of the bearing pad surface 5 at an upstream side of the pivot 3.

During operation of the tilting-pad bearing 1, the bearing gap 8 on the downstream side of the pivot 3 becomes small. Thus, the temperature of the bearing pad surface 5 on the downstream side of the pivot 3 is likely to increase due to friction heat between the bearing pad surface 5 and the lubricant oil trying to flow through the narrow bearing gap 8. Thus, at the downstream side, where the amount of deformation of the bearing pad 4 is large, the amount of deformation due to thermal deformation of the bearing pad 4 is relatively large.

In this regard, according to the above embodiment, it is possible to maintain the bearing gap 8 to be appropriate at the downstream side, where the amount of deformation is large.

As described above, according to the embodiments of the present invention, it is possible to maintain an appropriate oil-film pressure distribution of the bearing gap 8 of the tilting-pad bearing 1 and to keep a high bearing load capacity.

Embodiments of the present invention were described in detail above, but the present invention is not limited thereto, and various amendments and modifications may be implemented.

While the embodiment illustrated in FIGS. 5, 7, and 8 is described as being different from that in FIGS. 9, 11A, and 11B, these embodiments may be combined.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 Tilting-pad bearing
2 Casing
3 Pivot
4 Bearing pad
5, 11a to 14a Bearing-pad surface
6 Back surface
10 Rotor
11 to 14 Cutting plane
51 Upstream end portion
52 Downstream end portion
53 Boundary
54 First region
55 Second region
56 Contact region

The invention claimed is:

1. A tilting-pad bearing for rotatably supporting a rotor, comprising:
a casing; and
a plurality of bearing pads each mounted to the casing pivotably about a pivot,
wherein each of the plurality of bearing pads has a bearing pad surface facing the rotor, the bearing pad surface including
a first region disposed on an upstream side in a rotational direction of the rotor and having a first curvature radius, and
a second region disposed on a downstream side of the first region in the rotational direction and having a second curvature radius smaller than the first curvature radius,
wherein a curvature center of the first region is disposed closer to an upstream end of the bearing pad than a curvature center of the second region.

2. The tilting-pad bearing according to claim 1,
wherein the first region and the second region are disposed adjacent to each other across a boundary which extends along an axial direction of the tilting-pad bearing, and
wherein the boundary is disposed outside a contact region where the bearing pad is in contact with the rotor while the rotor is stopped.

3. The tilting pad bearing according to claim 2, wherein the boundary is disposed on a downstream side of the contact region in the rotational direction.

4. The tilting-pad bearing according to claim 1,
wherein the first region and the second region are disposed adjacent to each other across a boundary which extends along an axial direction of the tilting-pad bearing, and
wherein the boundary is in a range excluding a range of from $(\theta_0-10°)$ to $(\theta_0+10°)$, where $\theta_0$ is an angular position of the pivot in a circumferential direction of the tilting-pad bearing.

5. The tilting pad bearing according to claim 4, wherein the boundary is in an angular range larger than $(\theta_0+10°)$.

6. The tilting-pad bearing according to claim 1,
wherein the bearing pad surface has a concave shape in an axial direction of the tilting-pad bearing at least when the rotor is stopped.

7. The tilting-pad bearing according to claim 6,
wherein the bearing-pad surface comprises a center region and end portions in the axial direction, and is formed in the concave shape such that the center region is positioned farther from the rotor than the end portions.

8. The tilting-pad bearing according to claim 6,
wherein an amount of concave of the bearing pad surface in the axial direction is greater at a downstream side of the pivot than at an upstream side of the pivot in a rotational direction of the rotor.

9. A tilting-pad bearing for rotatably supporting a rotor, comprising:
a casing; and
a plurality of bearing pads each mounted to the casing pivotably about a pivot,
wherein each of the plurality of bearing pads has a bearing pad surface facing the rotor and formed in a concave shape in an axial direction of the tilting-pad bearing at least when the rotor is stopped,
wherein an amount of concave of the bearing pad surface in the axial direction is greater at a downstream side of the pivot than at an upstream side of the pivot in a rotational direction of the rotor.

10. A tilting-pad bearing for rotatably supporting a rotor, comprising:
a casing; and
a plurality of bearing pads each mounted to the casing pivotably about a pivot,
wherein each of the plurality of bearing pads has a bearing pad surface facing the rotor, the bearing pad surface including
a first region disposed on an upstream side in a rotational direction of the rotor and having a first curvature radius, and
a second region disposed on a downstream side of the first region in the rotational direction and having a second curvature radius smaller than the first curvature radius,
wherein the first region and the second region are disposed adjacent to each other across a boundary which extends along an axial direction of the tilting-pad bearing,
wherein the boundary is disposed outside a contact region where the bearing pad is in contact with the rotor while the rotor is stopped, and
wherein the boundary is disposed on a downstream side of the contact region in the rotational direction.

11. A tilting-pad bearing for rotatably supporting a rotor, comprising:
a casing; and
a plurality of bearing pads each mounted to the casing pivotably about a pivot,
wherein each of the plurality of bearing pads has a bearing pad surface facing the rotor, the bearing pad surface including
a first region disposed on an upstream side in a rotational direction of the rotor and having a first curvature radius, and
a second region disposed on a downstream side of the first region in the rotational direction and having a second curvature radius smaller than the first curvature radius, wherein the first region and the second region are disposed adjacent to each other across a boundary which extends along an axial direction of the tilting-pad bearing, wherein the boundary is in a range excluding a range of from $(\theta_0-10°)$ to $(\theta_0+10°)$, where $\theta_0$ is an angular position of the pivot in a circumferential direction of the tilting-pad bearing, and wherein the boundary is in an angular range larger than $(\theta_0+10°)$.

* * * * *